(12) United States Patent
Barker

(10) Patent No.: US 7,934,470 B1
(45) Date of Patent: May 3, 2011

(54) CAT CLIMBING, SCRATCHING, RESTING, AND PERCHING SYSTEM

(76) Inventor: N. Bruce Barker, Winter Park, FL (US)

( * ) Notice: Subject to any disclaimer, the term of this patent is extended or adjusted under 35 U.S.C. 154(b) by 260 days.

(21) Appl. No.: 12/342,709

(22) Filed: Dec. 23, 2008

(51) Int. Cl.
  *A01K 1/035* (2006.01)
(52) U.S. Cl. ........................ 119/28.5; 119/706
(58) Field of Classification Search ............... 119/28.5, 119/706, 468; 211/90.01; 248/251; 108/147.16–147.17, 152
  See application file for complete search history.

(56) References Cited

U.S. PATENT DOCUMENTS

| | | | |
|---|---|---|---|
| 2,900,956 A * | 8/1959 | Hoffman | 119/482 |
| 3,215,387 A * | 11/1965 | Thompson et al. | 248/224.7 |
| 4,523,526 A * | 6/1985 | O'Neill | 108/149 |
| 4,664,266 A | 5/1987 | Fausett et al. | |
| 5,002,012 A | 3/1991 | Pierrot | |
| 5,275,128 A | 1/1994 | Barnes | |
| 5,275,502 A * | 1/1994 | Glaza et al. | 404/35 |
| 5,509,373 A | 4/1996 | Elesh | |
| 5,513,575 A * | 5/1996 | Slade | 108/42 |
| 5,577,465 A | 11/1996 | Cook | |
| 5,794,385 A | 8/1998 | Donovan | |
| 5,809,933 A | 9/1998 | Conwell, III | |
| 5,960,739 A | 10/1999 | Storm | |
| 5,961,082 A | 10/1999 | Walter | |
| D431,695 S | 10/2000 | Burt | |
| 6,196,139 B1 | 3/2001 | Jensen et al. | |
| 6,360,689 B1 | 3/2002 | Weinert | |
| 6,574,924 B2 | 6/2003 | Maniezzo | |
| 6,663,201 B2 * | 12/2003 | Herron et al. | 312/245 |
| 6,736,278 B2 | 5/2004 | Chang | |
| 6,928,959 B1 * | 8/2005 | Trauernicht et al. | 119/847 |
| 7,614,363 B2 * | 11/2009 | Di Angelo et al. | 119/28.5 |
| 2005/0040124 A1 * | 2/2005 | Fontana et al. | 211/90.01 |
| 2007/0215054 A1 | 9/2007 | Reusche et al. | |
| 2008/0000428 A1 | 1/2008 | Cody et al. | |
| 2008/0149042 A1 | 6/2008 | Halpern | |
| 2008/0245280 A1 * | 10/2008 | Wainland | 108/153.1 |

* cited by examiner

Primary Examiner — Kimberly S Smith
Assistant Examiner — Danielle Clerkley
(74) Attorney, Agent, or Firm — QuickPatents, Inc.; Kevin Prince

(57) ABSTRACT

A perch system for use by an animal such as a cat is disclosed. The perch system is attachable to a generally vertical wall, such as in a residence, and includes a plurality of wall mounts that each include a rigid wall mounting plate and at least one rigid mounting post projecting therefrom. The perch system further includes at least one perch that includes at least one post attachment means fixed thereto for selectively attaching the perch to each mounting post of the at least one wall mount. At least one connector is adapted for selectively fixing the connector between the mounting posts of two adjacent wall mounts. An inside corner section may be included for fixing to an inside corner of the wall, and an outside corner section may be included for fixing to an outside corner of the wall.

10 Claims, 4 Drawing Sheets

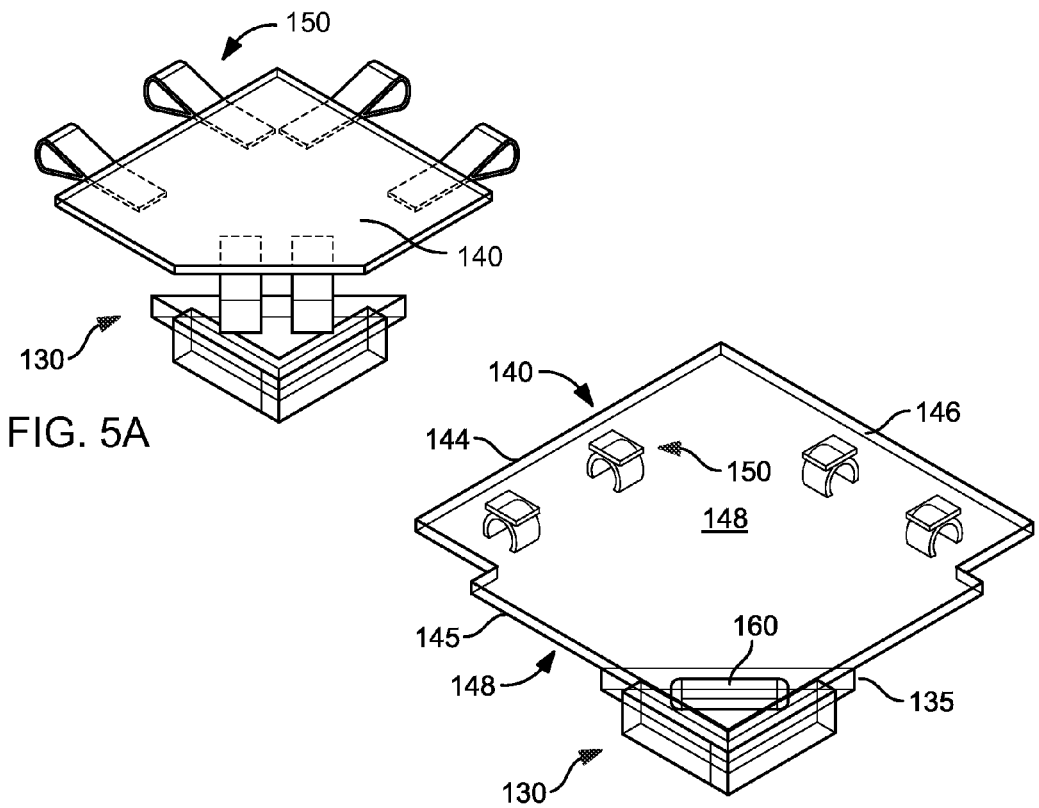
FIG. 5A
FIG. 5B
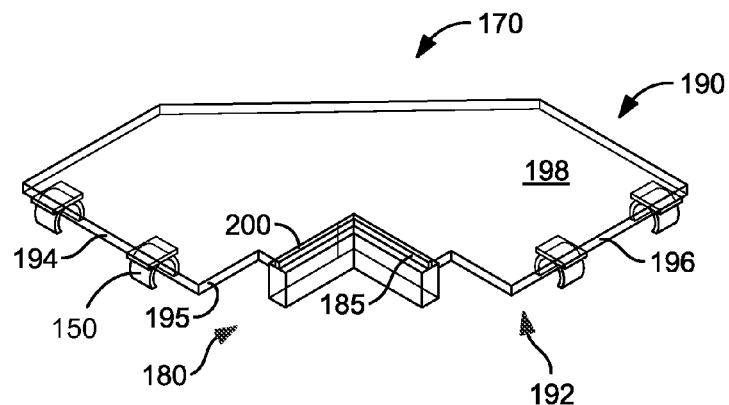
FIG. 6

US 7,934,470 B1

CAT CLIMBING, SCRATCHING, RESTING, AND PERCHING SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

NOTICE OF COPYRIGHTS AND TRADE DRESS

A portion of the disclosure of this patent document contains material which is subject to is copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

FIELD OF THE INVENTION

This invention relates to pets, and more particularly to a climbing, scratching, resting and perching system for cats.

DISCUSSION OF RELATED ART

It is well known that many animals and in particular cats like to climb scratch perch and rest as normal behavior activity associated with the animals physical and mental well being. Providing safe and stimulating apparatus to satisfy these needs is important for the health of the animal as well as helping to reduce the animals desire to perform said activities on the furniture and structures of the domicile in which the animals are kept. Ideally such apparatus should be wall mounted in order to avoid using valuable floor space and provide various vertical, horizontal and lateral surfaces for an animal to interact with and navigate in on and around. Said apparatus should also be of an attractive modular design that allows for flexible placement and use as well as being easy to clean alter customize and coordinate with existing décor whereby satisfying both the animals needs and those of the caretakers.

A number of different climbing perching scratching apparatus have been proposed. Many freestanding floor supported devices exist such as those shown in U.S. Pat. No. 3,604,397 issued to Salerno; U.S. Pat. No. 2,997,019 issued to Bryson; U.S. Pat. No. 2,894,487 issued to Goldson; U.S. Pat. No. 3,085,551 issued to Helmer. Typically these devices are made of solid materials covered in carpet. The disadvantages to such devices are limited scope of use for the animal, single location vertical activity flow, floor space requirements, potential instability when used by an animal, difficulty in cleaning, limitations in covering choices, and long term use viability.

Pole based devices as in U.S. Pat. No. 3,595,209 and U.S. Pat. No. 3,479,991 and U.S. Pat. No. 5,875,735 tend be large, complex and consume a great deal of space while only affording the animal limited range and scope in relation to its ability to move laterally. Said devices are typically single location with vertical activity flow, difficult to install, difficult to clean, difficult to customize for existing decors.

Devices consisting of a plurality of wall-mounted shelves staggered horizontally and vertically thus collectively forming a stairway are exampled in U.S. Pat. No. 6,196,139 is issued to Jensen and U.S. Pat. No. 5,809,933 issued to Conwell III. The primary disadvantages to these inventions is they do not accommodate an animal that has difficulty in jumping and therefore excludes them from use of the apparatus, they limit scratching surfaces to horizontal only and do not accommodate angled or vertical scratching surfaces and although by strict definition both of said prior art can claim climbing as an object of the invention they do not actually provide a means for vertical climbing surfaces that would allow an animal(s) to climb rather than just jump from one shelf/platform to another if desired. Other disadvantages include limited surface choices, no method for use on outside corners of intersecting walls, difficult to clean alter or customize, difficult to maintain.

It is the object of the present invention to provide a climbing scratching perching resting exerciser system which is particularly suited to cats that can be easily installed on one or more vertical walls of structure and provide multi-axis multi-level movement of the animal in on and around the apparatus by means of walking, climbing and jumping.

The prior art fails to show a modular system suitable of adequately providing walking, climbing and clawing interactivity use by an animal or allow for simple and effective interchangeability customization and replacement of components or provide a means for easy maintenance and cleaning. The present invention accomplishes these objectives.

SUMMARY OF THE INVENTION

The present device is a perch system attachable to a generally vertical wall, such as in a residence. The perch system is for use by an animal, such as a cat. At least one wall mount is included in the perch system, each wall mount including a rigid wall mounting plate. Each wall mount further includes at least one wall mounting means and at least one rigid mounting post, each of which are fixed with the mounting plate. The perch system further includes at least one perch that includes at least one post attachment means fixed thereto for selectively attaching the perch to each mounting post of the at least one wall mount.

Preferably the perch system further includes at least one connector having a first end and a second end, each end having a post connecting means fixed therewith that is adapted for selectively fixing the connector to one of the mounting posts. As such, one such connector may be suspended between the mounting posts of two adjacent wall mounts.

Preferably the perch system further includes an inside corner section, each comprising an inside corner wall mounting means adapted to mount to an inside corner of the wall and an L-shaped inside corner perch. The inside corner perch further includes a first end and a second end, each end having a post connecting means fixed therewith that is adapted for selectively fixing the inside corner perch to one of the mounting posts of one of the wall mounts.

Preferably the perch system further includes an outside corner section comprising an outside corner wall mounting means and an outside corner perch that has a first end and a second end, each end having one of the post connecting means fixed thereto and adapted for selectively fixing the outside corner perch to one of the mounting posts of one of the wall mounts.

The present device is a modular system suitable of adequately providing walking, climbing and clawing use by an animal, and allows for simple and effective interchangeability, customization and replacement of components. The present invention further provides for easy maintenance and cleaning of the perch system. Other features and advantages of the present invention will become apparent from the following more detailed description, taken in conjunction with the accompanying drawings, which illustrate, by way of example, the principles of the invention.

DESCRIPTION OF THE DRAWINGS

FIG. 5A is a perspective view of one embodiment of an inside corner section of the present invention;

FIG. 5B is a perspective view of an alternate embodiment of the inside corner section of the present invention; and FIG. 6 is a perspective view of an outside corner section of the present invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
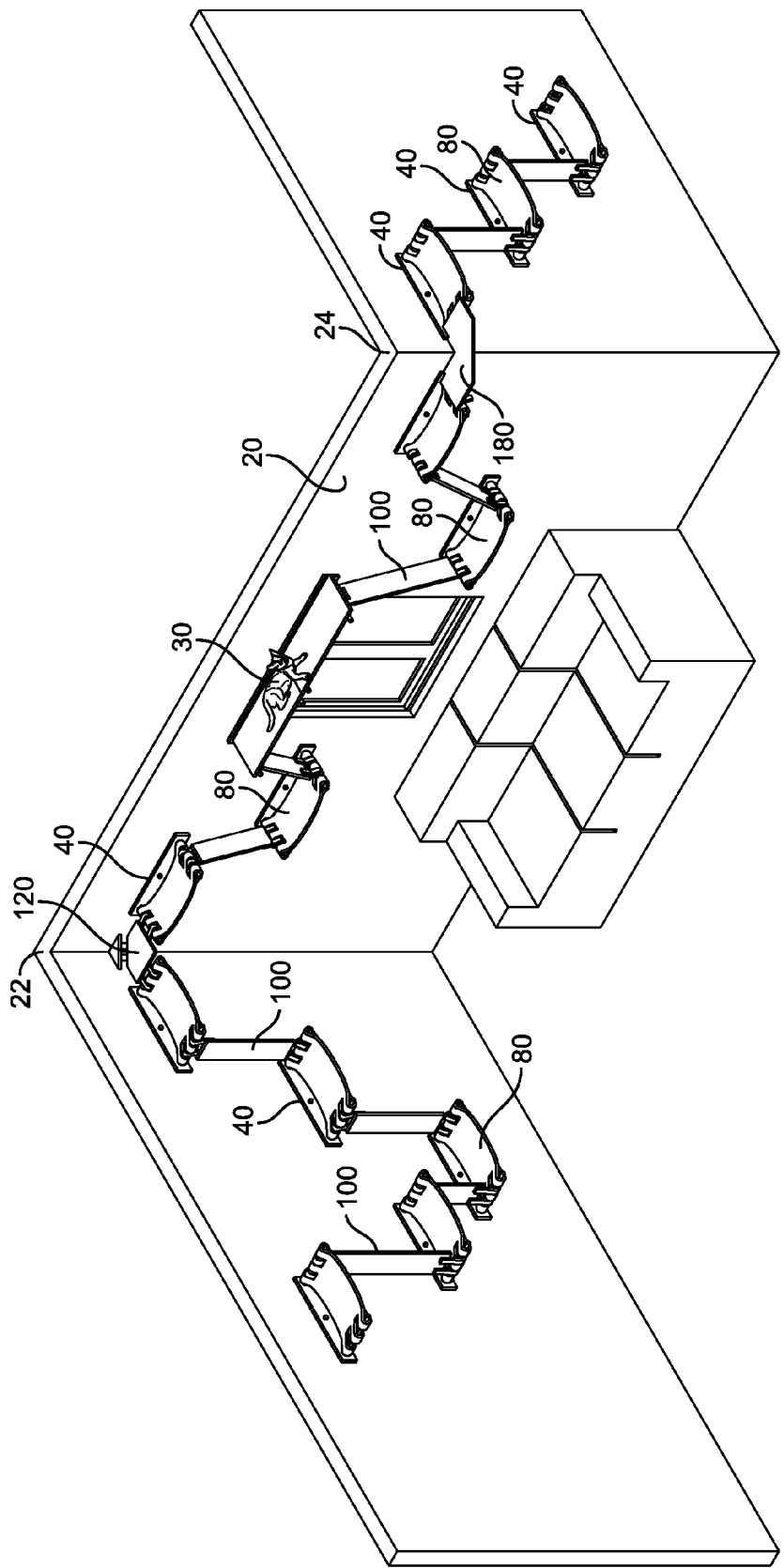
FIG. 1 is a perspective view of a perch system as attached to a generally vertical wall and for use by an animal, such as a cat.

FIG. 1 illustrates a perch system 10 attachable to a generally vertical wall 20. The perch system 10 is for use by an animal 30, such as a cat.

Figure 2:
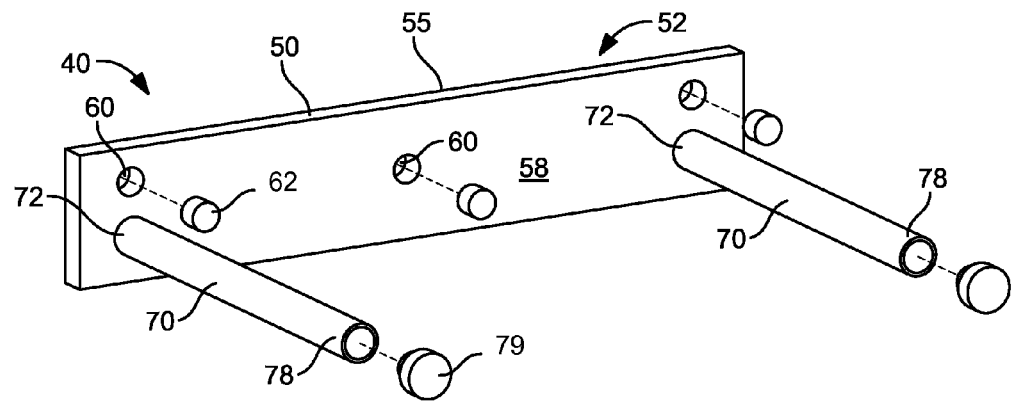
FIG. 2 is an exploded perspective view of a wall mount of the present invention.

At least one wall mount 40 (FIG. 2) is included in the perch system 10, each wall mount 40 including a rigid wall mounting plate 50. The wall mounting plate 50 includes a rear side 52, a front side 58, and at least one peripheral edge 55 that connects the front and rear sides 52,58 thereof. Each wall mounting plate 50 may be made from a rigid plastic, wood, metal or like material. Each wall mount 40 further includes at least one wall mounting means 60, such as an aperture through the plate 50 for driving a screw (not shown), for example. A cap 62 may be further included to hide the head of the screw (not shown) after installation.

Each wall mount 40 further includes at least one rigid mounting post 70, each of which are fixed at proximal end 72 thereof with the mounting plate 50. Each mounting post 70 further includes a distal end 78, and projects preferably generally orthogonally away from the wall 20 when the wall mounting means 60 is used to fix the wall mount 40 to the wall 20. Preferably each mounting post 70 is a section of rigid metal or plastic extruded tube stock, wood, or the like. In such an embodiment, a cap 79 may be included at the distal end 78 of each mounting post 70 to close the distal end 78 thereof. In alternate embodiments of the invention (not shown), each mounting post 70 may be a rigid section of rectangular or circular non-hollow rod stock, wooden boards, or other suitable material for projecting away from the mounting plate 50 and fixing securely thereto. Each mounting post 70 may be fixed at the proximal end to the mounting plate 50 with mechanical fasteners, welding, or other suitable means known in the art.

The perch system 10 further includes at least one perch 80 (FIGS. 3A and 3B) that includes a top surface 88, a bottom surface 82, and a peripheral edge 85 connecting the top and bottom surfaces 88,82. Each perch 80 further includes at least one post attachment means 90 fixed with the bottom surface 82 of the perch 80 for selectively attaching the perch 80 to each mounting post 70 of the at least one wall mount 40. Each perch 80 is preferably generally horizontally disposed when attached to one of the wall mounts 40, although a user could conceivably mount one or more wall mounts 40 in a non-horizontal fashion if desired.

Figure 3A:
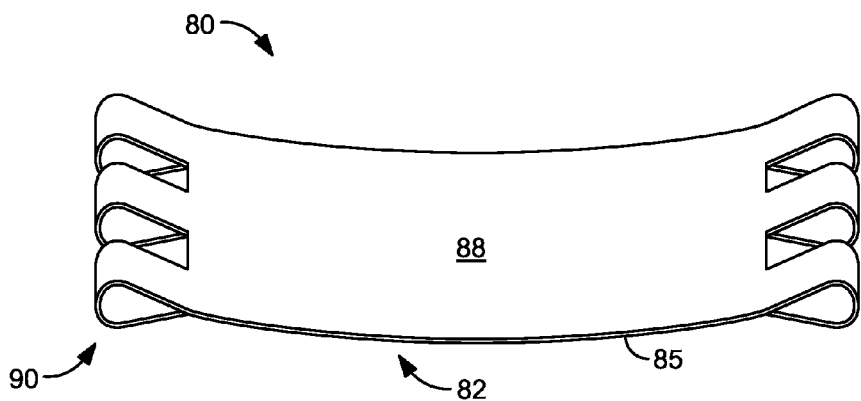
FIG. 3A is a perspective view of one embodiment of a perch of the present invention.

As illustrated in FIG. 3A, each post attachment means 90 may be one or more loops of the material used to make the perch 80. As such, each post attachment means 90 may be slid onto each mounting post 70 to secure the perch 80 to the wall mount 40. In such an embodiment, each cap 79 may be made with a slightly overhanging lip (not shown), that is, a portion of each cap 79 may be made with a slightly larger diameter than each is mounting post 70, so as to retain the perch 80 onto the wall mount 40.

Figure 3B:
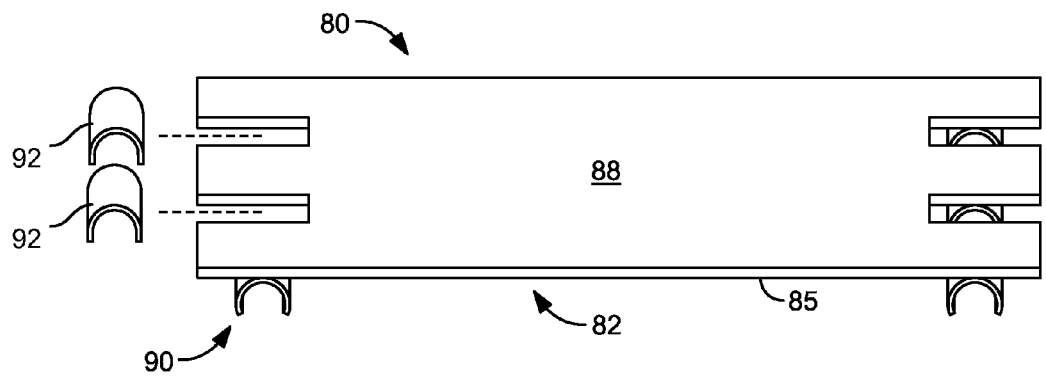
FIG. 3B is a perspective view of an alternate embodiment of a perch of the present invention.

Alternately, as illustrated in FIG. 3B, each post attachment means 90 may be a resilient clip 92 fixed with the bottom surface 82 of each perch 80, such that the perch 80 may be selectively snapped onto each mounting post 70, each clip 92 frictionally holding the perch 80 in place on the wall mount 40.

Figure 4:
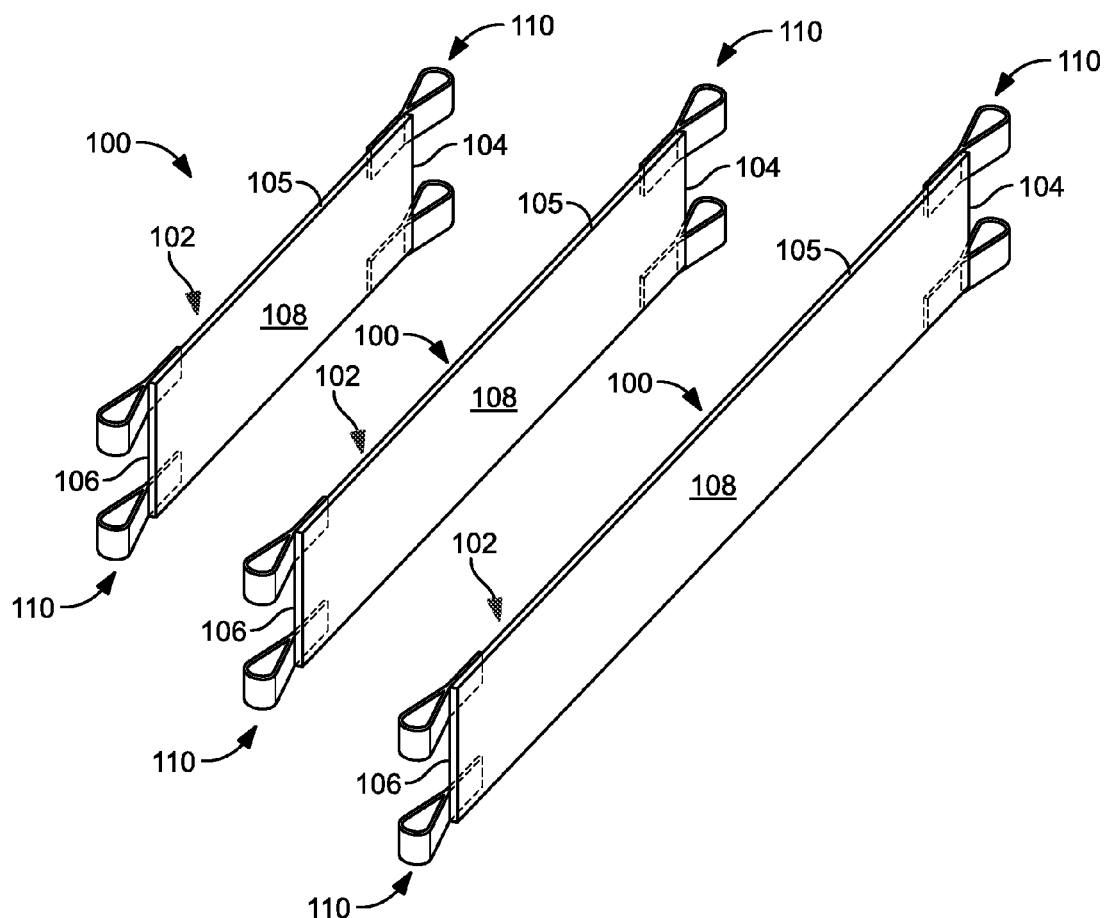
FIG. 4 is a perspective view of three varying sizes of connectors of the present invention.

Preferably the perch system 10 further includes a connector 100 (FIG. 4) having a top surface 108, a bottom surface 102, and a peripheral edge 105 connecting the top and bottom surfaces 108,102. Each connector 100 further includes a first end 104 and a second end 106, each end 104,106 having a post connecting means 110 fixed therewith that is adapted for selectively fixing the connector to one of the mounting posts 70. As such, one such connector 100 may be suspended between the mounting posts 70 of two adjacent wall mounts 40. Varying sizes of the connectors 100 may be utilized to span adjacent wall mounts 40 of various distances apart, either horizontally or vertically on the wall 20.

Preferably the perch system 10 further includes an inside corner section 120 (FIGS. 5A and 5B), each comprising an inside corner wall mounting means 130 adapted to mount to an inside corner 22 of the wall 20. The inside corner wall mounting means 130 preferably includes at least one flange 135 projecting away from the wall 20. The inside corner section 120 further includes an L-shaped inside corner perch 140 having a top surface 148, a bottom surface 142, and a peripheral edge 145 connecting the top and bottom surfaces 148,142. The L-shaped inside corner perch 140 further includes a first end 144 and a second end 146, each end 144,146 having a post connecting means 150 fixed therewith that is adapted for selectively fixing the inside corner perch 140 to one of the mounting posts 70 of one of the wall mounts 40. The inside corner perch 140 further includes an inside corner wall mounting means attachment means 160 selectively attachable to the flange 135 of the inside corner wall mounting means 130. In one embodiment of the invention, the inside corner perch 140 is adapted to fit the inside corner 22 of the wall that forms a 90 degree angle. However, the inside corner perch 140 could also be made to accommodate other angles of the corner 22.

Preferably the perch system 10 further includes an outside corner section 170 comprising an outside corner wall mounting means 180 that is adapted to mount to an outside corner 24 of the wall 20 (FIGS. 1 and 6) and includes at least one flange 185 projecting away from the wall 20. The outside corner section 170 further includes an outside corner perch 190 that has a top surface 198, a bottom surface 192 and a peripheral edge 195 connecting the top surface 192 with the bottom surface 198. The outside corner perch 190 further includes a first end 194 and a second end 196, each end 194,196 having one of the post connecting means 150 fixed thereto and adapted for selectively fixing the outside corner perch 190 to one of the mounting posts 70 of one of the wall mounts 40. The outside corner perch 190 further includes an outside corner wall mounting means attachment means 200 selectively attachable to the flange 185 of the outside corner wall mounting means 180. In one embodiment of the invention, the outside corner perch 190 is adapted to fit the outside corner 24 of the wall that forms a 270 degree angle. However, the outside corner perch 190 could also be made to accommodate other angles of the corner 24.

Any of the perches 80, connectors 100, inside corner perch 140, or outside corner perch 190 may be made of flexible web material, such as a textile or non-woven fabric, or alternately made from a rigid material such as plastic, wood, or other suitably rigid material. Preferably at least one connector 100 includes a flexible fibrous material suitable for a cat 30 to sharpen its claws thereon (not shown).

In use, the perch system 10 can be installed on a large number of walls 20 in a residence, for example. The perch system 10 may include any number of wall mounts 40, perches 80, connectors 100, and inside and outside corner perches 140, 190.

While a particular form of the invention has been illustrated and described, it will be apparent that various modifications can be made without departing from the spirit and scope of the invention. For example, mounting posts 70 may be made of varying lengths so that deeper or narrower perches, connectors, and corner perches may be made than those illustrated. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the is particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with is which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A perch system attachable to a generally vertical wall and for use by an animal, comprising:

at least two wall mounted support frames each having a rigid wall mounting plate, each rigid wall mounting plate having a rear side, a front side, at least one peripheral edge connecting the front side with the rear side, at least one wall mounting means and at least two mounting posts fixed at a proximal end thereof, each mounting post further including a distal end, each mounting post projecting generally orthogonally away from the wall when the wall mounting means is used to fix each wall mounted support frame to the wall;

at least two removable platforms each having a top surface, a bottom surface, and a peripheral edge connecting the top surface with the bottom surface, each platform including at least one tool-less post attachment means fixed thereto, in a first interlocking pattern, for selectively attaching each platform to first and second mounting posts of one or more of the at least two wall mounted support frames, each platform being generally horizontally disposed when attached to one of the wall mounted support frames; and at least one removable bridge connector having a top surface, a bottom surface, and a peripheral edge connecting the top surface with the bottom surface, the at least one bridge connector having a first end and a second end, each of the first end and the second end of the bridge connector having a tool-less mounting post attachment means fixed thereto, in a second interlocking pattern having opposed slotting from that of the first interlocking pattern of the at least two removable platforms, for selectively attaching the at least one bridge connector to two individual mounting posts, the first and second interlocking patterns allowing both a removable platform and a removable bridge connector to affix to the same mounting post.

2. The perch system of claim 1 further including an inside corner section comprising:

an inside corner wall mounting means adapted to mount to the inside corner of the wall, the inside corner wall mounting means including at least one flange projecting away from the wall; and an L-shaped inside corner perch having a top surface, a bottom surface, a peripheral edge connecting the top surface with the bottom surface, a first end and a second end, each end having a post connecting means fixed thereto that is adapted for selectively fixing the inside corner perch to one of the mounting posts of one of the wall mounted support frames, the inside corner perch having an inside corner wall mounting means attachment means selectively attachable to the flange of the inside corner wall mounting means.

3. The perch system of claim 1 including an outside corner section comprising:

an outside corner wall mounting means adapted to mount to the outside corner of the wall, the outside corner wall mounting means including at least one flange projecting away from the wall; and an L-shaped outside corner perch having a top surface, a bottom surface, a peripheral edge connecting the top surface with the bottom surface, a first end and a second end, each end having a post connecting means fixed thereto that is adapted for selectively fixing the outside corner perch to one of the mounting posts of one of the wall mounted support frames, the outside corner perch having an outside corner wall mounting means attachment means selectively attachable to the flange of the outside corner wall mounting means.

4. The perch system of claim 2 wherein the inside corner perch is adapted to fit the inside corner of the wall that forms a 90 degree angle.

5. The perch system of claim 3 wherein the outside corner perch is adapted to fit the outside corner of the wall that forms a 270 degree angle.

6. The perch system of claim 1 wherein at least one of the removable platforms is made from a flexible material.

7. The perch system of claim 1 wherein at least one of the removable platforms is made from a rigid material.

8. The perch system of claim 1 wherein the at least one bridge connector is made from a flexible material.

9. The perch system of claim 2, wherein the inside corner wall mounting means includes:

a triangle-shaped flange, having a rear side, a front side, and at least one peripheral edge connecting the front side with the rear side, the triangle-shaped flange adapted to be attached to the inside corner of the wall and to the inside corner perch with the inside corner wall mounting means attachment means.

10. The perch system of claim 3, wherein the outside corner wall mounting means includes:

an L-shaped ledger flange having a rear side, a front side, and at least one peripheral edge connecting the front side with the rear side, the ledger flange adapted to be attached to the outside corner of the wall and to the outside corner perch.

\* \* \* \* \*